United States Patent
Greene et al.

(12) 
(10) Patent No.: US 6,292,157 B1
(45) Date of Patent: Sep. 18, 2001

(54) FLAT-PANEL DISPLAY ASSEMBLED FROM PRE-SORTED TILES HAVING MATCHING COLOR CHARACTERISTICS AND COLOR CORRECTION CAPABILITY

(75) Inventors: Raymond G. Greene, Ovid; Robert H. Katyl, Vestal; J. Peter Krusius; Boris Yost, both of Ithaca, all of NY (US)

(73) Assignee: Rainbow Displays, Inc., Endicott, NY (US)

( * ) Notice: Subject to any disclaimer, the term of this patent is extended or adjusted under 35 U.S.C. 154(b) by 0 days.

(21) Appl. No.: 09/063,321

(22) Filed: Apr. 20, 1998

Related U.S. Application Data (63) Continuation of application No. 08/618,046, filed on Mar. 25, 1996, now abandoned.

(51) Int. Cl.[7] ................ G09G 5/00; H04N 5/66
(52) U.S. Cl. ................ 345/1; 345/903; 348/383
(58) Field of Search .................. 345/1, 32, 55, 345/87, 88, 90, 103, 903; 348/383, 751, 791; 349/106, 109, 112; 358/518–523; 324/770

(56) References Cited

U.S. PATENT DOCUMENTS

| | | |
|---|---|---|
| 4,825,201 | 4/1989 | Watanabe et al. . |
| 4,982,275 | 1/1991 | Brody . |
| 5,046,827 * | 9/1991 | Frost et al. ............ 349/112 |
| 5,105,183 * | 4/1992 | Beckman ................ 345/1 |
| 5,396,257 | 3/1995 | Someya et al. . |
| 5,465,052 * | 11/1995 | Henley ................. 345/87 |
| 5,504,438 * | 4/1996 | Henley ................. 324/770 |
| 5,555,035 * | 9/1996 | Mead et al. ............ 348/383 |
| 5,563,725 * | 10/1996 | Kumada et al. .......... 358/518 |
| 5,579,031 * | 11/1996 | Liang ................ 345/154 |
| 5,661,531 * | 8/1997 | Greene et al. .......... 349/73 |
| 5,764,209 * | 6/1998 | Hawthorne et al. ....... 345/87 |
| 5,784,035 * | 7/1998 | Hagiwara et al. ........ 345/1 |
| 5,805,117 * | 9/1998 | Mazurek et al. ......... 345/1 |
| 5,889,568 * | 3/1999 | Seraphim et al. ........ 345/1 |
| 5,987,167 * | 11/1999 | Inoue ................. 358/518 |

* cited by examiner

*Primary Examiner*—Steven Saras
*Assistant Examiner*—Paul A. Bell
(74) *Attorney, Agent, or Firm*—Salzman & Levy (57) ABSTRACT

The present invention features a tiled, flat-panel, color display that has a color-correction capability. The display is a tiled mosaic of individual display tiles, such as AMLCDs. Column and row inputs that are typically provided for a single display tile system are distributed over a plurality of display tiles. The color purity is achieved for the display by sorting the tiles into groups, matching their color coordinates, and correcting non-uniformities optically (e.g., by using a graded neutral density filter having a grading function being the inverse of the brightness distribution non-uniformities) and/or electronically. Then, each individual tile in the mosaic is color-corrected via a multiplexed, controller/driver circuit.

8 Claims, 13 Drawing Sheets

FLAT-PANEL DISPLAY ASSEMBLED FROM PRE-SORTED TILES HAVING MATCHING COLOR CHARACTERISTICS AND COLOR CORRECTION CAPABILITY

RELATED APPLICATIONS

This application is a continuation of application Ser. No. 08/618,046, filed Mar. 25, 1996, now abandoned.

FIELD OF THE INVENTION

The invention pertains to flat-panel electronic displays and, more particularly, to a flat-panel, electronic display with color-correction capability, a display that is assembled by piecing together a plurality of color tiles that exhibit manufacturing non-uniformities.

BACKGROUND OF THE INVENTION

Images on electronic displays are formed by an array of small picture elements known as pixels. In electronic color displays, these pixels comprise three color elements that produce the primary colors red, blue and green for matching any other color. Usually arranged as squares or rectangles, the pixel array can be characterized by pixel pitch, P, a quantity that measures the density of pixels per unit distance. A typical cathode-ray tube display has a pixel pitch of 0.3 mm. Typical small computer screens have a pixel array width-to-height ratio of 4 to 3. Pixel arrays in electronic displays are typically disposed in 640×480 (VGA), 800×600 (SVGA) or 1024×768 (XGA) configurations.

Virtually all commercial display products are manufactured as a single monolithic pixel array with a constant pixel pitch across the entire face of the display. While this produces continuous images across the entire display, at the same time, it limits the sizes of the pixel arrays to what can be manufactured as a single display unit given the yield of the fabrication processes and assembly techniques employed. For example, cathode ray tube (CRT) displays are limited to a screen diagonal of about 35" and active matrix liquid crystal displays (AMLCD) to about 15".

In principle, larger displays comprising a plurality of adjacent display units, arranged as tiles like a bathroom floor, can be used to overcome the size limitations of manufacturing and assembly processes. However, this has proven extraordinarily difficult. The reason lies in the seams generated between the tiles from the manufacturing and assembly processes. Because of edges in the display tiles, assembly, alignment, and brightness and color non-uniformity on adjacent tiles, the seams not only become visible, but produce image segmentation, brightness offsets, and color errors that are unacceptable to the human eye. A well documented but failed effort to manufacture tiled displays is given by Magnascreen Corporation, a Pittsburgh based company that ceased operations in the mid 1990's[1]. Despite these difficulties it is desirable to develop methods for tiling displays in order to overcome manufacturing and assembly limitations. The worldwide display market is expected to be on the order $40 B by the year 2000; greatest growth potential is in large displays.

The pixel pitch in electronic displays is set so that at the minimum viewing distance the human eye cannot resolve individual pixels. This limit is about 0.5 arc-minutes for typical display viewing conditions. For example, with a pixel pitch of P=0.3 mm, the minimum viewing distance becomes about three feet. Therefore, the width of any seams that are placed between the tiles in assembled displays must generally be less than the pixel pitch in order for the seam to become imperceptible. This is a very severe requirement that rules out most display technologies. For example, the CRT requires the pixel array to be enclosed in a vacuum vessel made of glass that is much thicker than the pixel pitch.

Assemblies of displays having wide display units or unusually large pixel pitches between adjacent display units are generally called multi-screen displays and do not possess imperceptible seams. Rather, the seams are usually deliberately covered by black stripes in order to make them less disturbing. Examples of such a multi-screen display apparatus have been described by Watanabe et al. from Mitsubishi [2] and Someya from Hitachi [3]. In both of these cases, color corrections are applied to larger regions of independent displays with very large pixel gaps between the display units. Therefore, image correction methods developed for such display assemblies, whether applies to geometric patterns, brightness, or color, have been designed to apply to pixels always separated by a large spacing at least as wide as the seam. Therefore the application of such methods to tiled displays with closely spaced pixels (uniform pixel pitch) will not produce imperceptible seams. Human visual perception has been found to be very sensitive to minute discontinuities in images, whether of a geometrical, photometric or calorimetric nature. This invention describes methods that apply to tiled displays with uniform pixel pitches over the entire display surface, including across seams, and therefore has to deal with displayed images to the most minute discontinuities.

Flat-panel displays (FPDs) are good candidates for making tiled displays, because the edges of the display elements (tiles) can potentially be made small enough. FPDs include liquid crystal displays (LCDs), active matrix LCDs (AMLCDs), plasma displays (PDs), field emission displays (FEDs), electroluminescent displays (ELDs) and digital mirror displays (DMDs), all of which depend on the microfabrication of the key components carrying the pixel patterns. AMLCD is a technology currently favored by the industry and it has a large market share, in particular in notebook computers. For purposes of clarity, the term "LCD" is used herein, but is intended to describe all types of flat-panel displays.

From a practical point of view, the yield of microfabrication is unacceptable for large size displays, due to the fact that yield generally falls exponentially with area and an unacceptable number of fabricated pieces must be rejected. The present inventors, therefore, have determined that smaller pixel arrays (tiles) can be microfabricated and, after appropriate selection, assembled together to form a larger display comprising an array of tiles. However, past attempts have led to visible seams due, in large part, to the space required by tile edges and assembly into the full displays. Hence, pixel spacings across seams have been much larger than those required of monolithic displays. This is essentially the reason for the fact that very few attempts have been made to achieve large, color, "seamless", tiled displays.

In co-pending U.S. patent applications, Ser. Nos. 08/593,759 and 08/571,208, filed on Jan. 29, 1996 and Dec. 12, 1995, respectively, a method of constructing a seamless, tiled, flat-panel display is illustrated. The teachings of these companion applications are meant to be incorporated herein by way of reference.

The electronic circuitry built into or used with conventional monolithic, non-tiled display has two functions:

(1) transform the incoming electronic representation or video signal of the image to be displayed into a format compatible with the display device, and send this tranformed signal continuously and in real time to the display device; and (2) provide a set-up and adjustment capability to the display. Brightness, contrast, threshold, tint, white point and reference levels are examples. Some of these adjustments can be set by both the viewer and the display manufacturer; others are deliberately made inaccessible to the viewer. To the display manufacturer, these adjustments allow reasonable manufacturing tolerances for the components of the display. They also allow for variations across the viewing area of the display unit that occur, at least in part, due to an inherent non-uniformity of manufacturing processes. As the result these adjustments present a more acceptable picture quality to the viewer. In addition, these adjustments allow some picture quality attributes to be changed, in order to suit individual viewing preferences and viewing conditions.

The extension of the first function above, transformation of the video data from a monolithic display to a tiled display, is straightforward to a person skilled in the art of displays. This invention describes methods of extending the second function, display adjustments to a tiled display, in such a way that the displayed picture quality is equivalent to a non-tiled display. Note that this is a much more difficult undertaking than adjusting multi-screen display apparatuses as discussed above. Alternative methods for improving the picture quality on a tiled display and making it visually comparable or superior to that of a monolithic display can be based on new techniques for the aforementioned function (1) and combinations of functions (1) and (2).

The present invention provides unique circuitry and a display tile assembly for achieving color purity in a "seamless" tiled display, comprising a tiled mosaic of individual LCDS. In any tiled displays, that are commercially acceptable, color purity has to be uniform within each tile. That is, there should be no apparent differences in brightness or color between tiles over the entire range of input video signals to be rendered. Note that this is a more stringent requirement on tiled displays than on monolithic displays, because the human visual system accepts smooth non-uniformities as large as 10–20%, while abrupt changes have to be controlled to about 1%.

Figure 1:
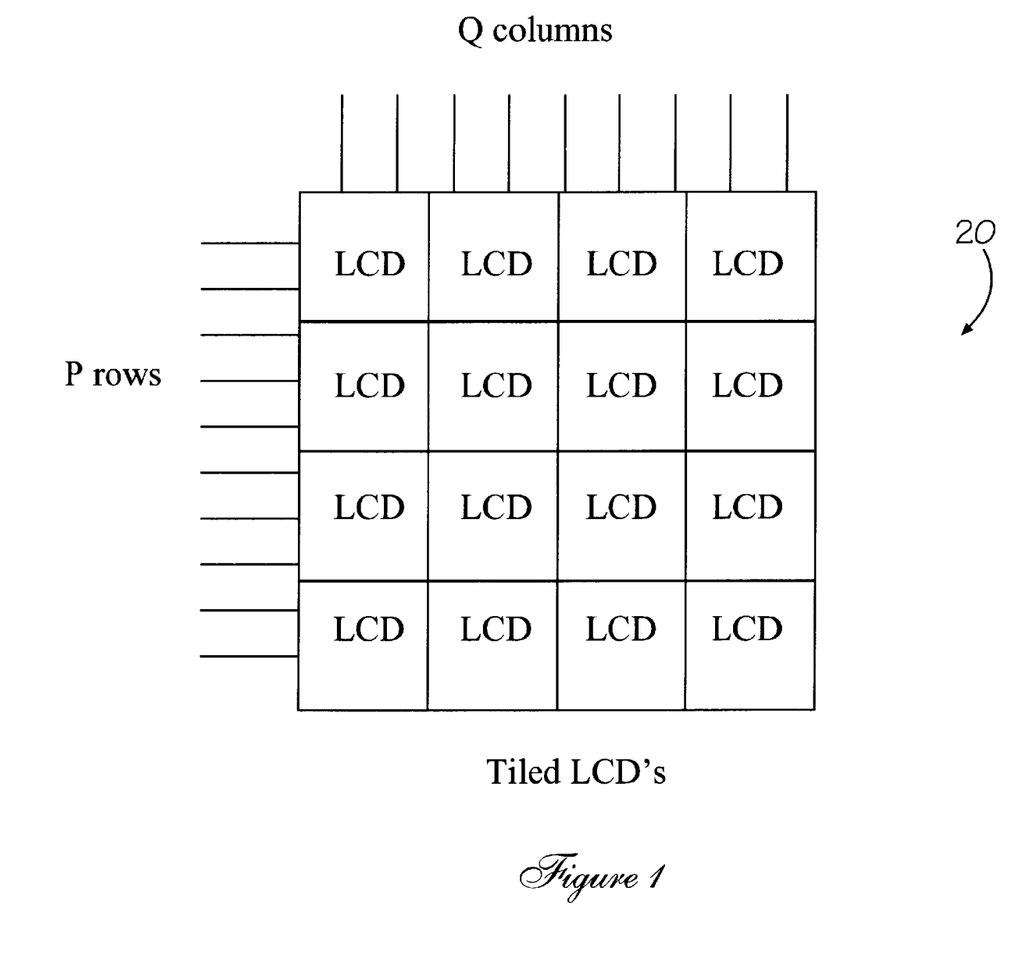
FIG. 1 depicts a schematic plan view of the column and row inputs for a tiled LCD system.
Figure 1A:
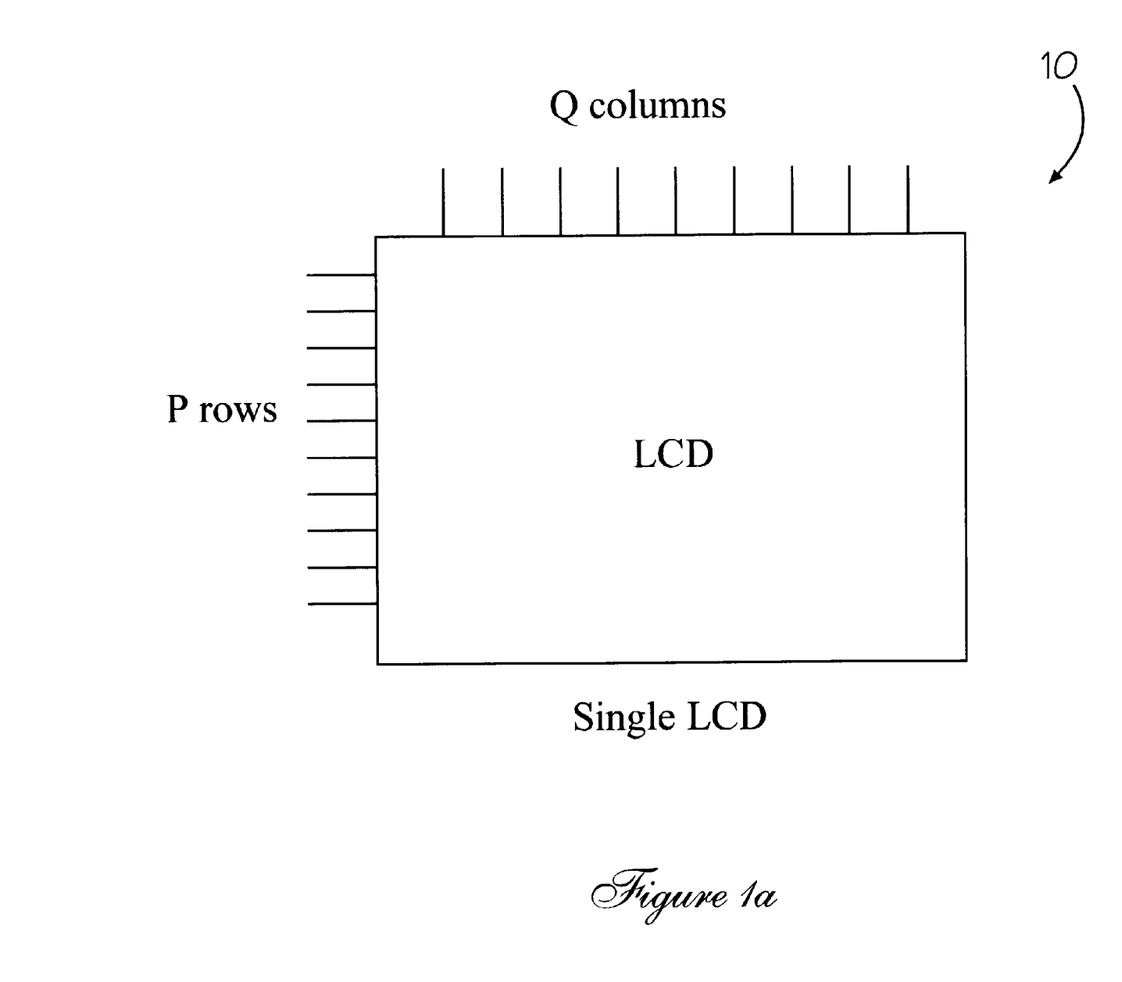
Figure 1B:
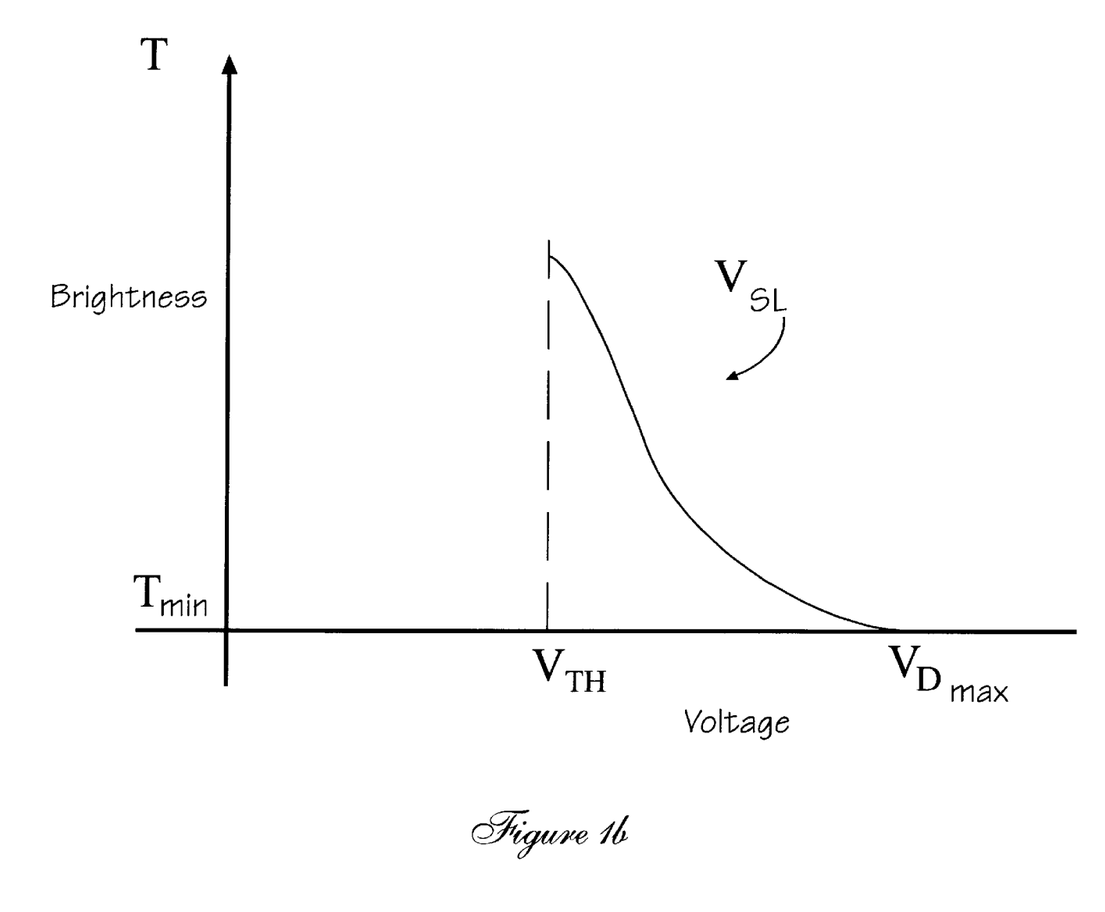

The optical performance of a display can be characterized by parameters that describe the voltage input to pixels and the resulting transmission of the elements. For example, AMLCDs have threshold voltages $V_{TH}$ and $V_{Dmax}$ for maximum and minimum transmission, $T_{max}$ and $T_{min}$ (see FIG. 1$aa$). The pixel optical gain, $V_{SL}$, can be described as the slope of the transmission-voltage curve. Color coordinates may also vary. A similar set of parameters can be identified for other types of flat-panel displays.

In the extension from conventional monolithic displays to tiled displays, additional parameters related to the quality of the display near the edge of each tile can be identified, for example, due to the filling of the liquid crystal material or the thickness of the cell gap. Further abrupt variations arise from the butting of adjacent tiles, each with smooth variations typical of monolithic displays. Other optical components of the display may also vary.

Color purity is defined as the condition of uniform saturation of primary colors over the screen. There are several sources of inter-tile color differences, including differences in the color coordinates between tiles, threshold and transmission voltages in the pixels adjacent the seams, color filter variations from tile to tile, etc.

The inventors realize that individual tiles can provide acceptable color purity; therefore, a standard LCD controller/driver chip set, as is commercially available for example, from Toshiba or Hitachi, can be integrated into a circuit that is used to achieve total color purity throughout a tiled LCD display. However, the exclusive use of conventional controller and driver circuits will not render a seamless display. Therefore, further circuits are added in order to achieve color corrections to a level that appears uniform to the average human observer.

SUMMARY OF THE INVENTION

In accordance with the present invention, there is provided a tiled, flat-panel display with color-correction capability. The display comprises a tiled mosaic of individual LCDs assembled in such a way that the seams between the tiles appear imperceptible. Column and row inputs that are typically provided for a monolithic LCD unit are distributed over a plurality of LCD tiles. The color purity is achieved for the tiled display by first sorting the tiles prior to assembly into groups of individual LCDs on the basis of their color characteristics. Obtaining a matched set is defined as having the intra-tile average color coordinate values for each primary color (e.g., red, green and blue) to fall within a specified range for each tile. Each individual tile in the mosaic has its own set of parameters for the controller/driver circuit. The sets of such parameter values are multiplexed at the correct times to the controller, so that appropriate values will be present, when data is being written to each tile. Average tile brightness is achieved by scaling the video level with a tile-dependent set of constants (one for each tile). Discontinuities, or large level shifts from one tile edge to another, are corrected for by placing a negative of the display (i.e., a graded neutral density filter, in the preferred embodiment) on the screen. This will match the brightness levels across the entire display. The exposure will be made so that the dimmest region has no reduction; and only the brighter regions will be reduced. This discontinuity correction can also be accomplished by adjusting (balancing) signals electronically.

It is an object of this invention to provide an improved electronic flat-panel, tiled, color display with a continuous pixel pitch across the seams.

It is another object of this invention to provide an electronic flat-panel, tiled, color display that is constructed with matched, color-coordinated tiles with a continuous pixel pitch across the seams.

It is a further object of the invention to provide a color-correcting circuit for a tiled, color display with a continuous pixel pitch across the seams.

BRIEF DESCRIPTION OF THE DRAWINGS

A complete understanding of the present invention may be obtained by reference to the accompanying drawings, when considered in conjunction with the subsequent detailed description, in which:

FIG. 1$b$ is a transmission versus voltage curve for a normally white liquid crystal cell (transparent when not drive voltage is applied);

FIG. 1$a$ shows a schematic plan view of the column (data) and row (control) inputs for a typical, single, monolithic LCD array;

DESCRIPTION OF THE PREFERRED EMBODIMENT

Generally speaking, the present invention features a tiled, flat-panel, color display that has a color purity correction capability. The display comprises a tiled mosaic of individual LCDs that has been manufactured and assembled such that the seams between the tiles are intended to become imperceptible to the average human observer upon application of color corrections described in this invention. Column and row inputs that are typically provided to a single conventional monolithic LCD system are distributed over a predetermined number of LCD tiles. The color purity is achieved for the display by first sorting the tiles into groups of individual LCDs, based on their color characteristics, prior to assembly. Then, each individual tile in the mosaic is color-corrected via a multiplexed, controller/driver circuit in order to achieve uniform color characteristics across the entire tiled display despite the continues pixel pitch across the seams.

Now referring to FIG. 1a, a schematic plan view of column "Q" and row "P" inputs for a typical, single LCD array 10 is illustrated. The display 20 of this invention is constructed of a plurality of individual LCD tiles, having inputs Q and P that are fed to each LCD tile, as illustrated in FIG. 1. The tiles have been manufactured and assembled such that the pixel pitch across all seams is the same as that on the tiles. The tiles are first sorted into groups of individual LCD tiles for a given display assembly, each of which is matched with the same color characteristics prior to assembly. Having a matched set is defined as an LCD display wherein each tile has inter-tile average color parameter values that are within a specified range of each other, and which do not exceed a given or specified value. Sorting may be performed in a variety of ways, depending on the type of flat-panel tile being used. For example, for AMLCDs, the sorting may be performed on the tile top plates (color filter array), before or after the bottom plate with thin film transistors (TFT) is attached. In co-pending U.S. patent application, Ser. No. 08/636,604, adjustments for pixel level non-uniformities and backlight are discussed.

Figure 2:
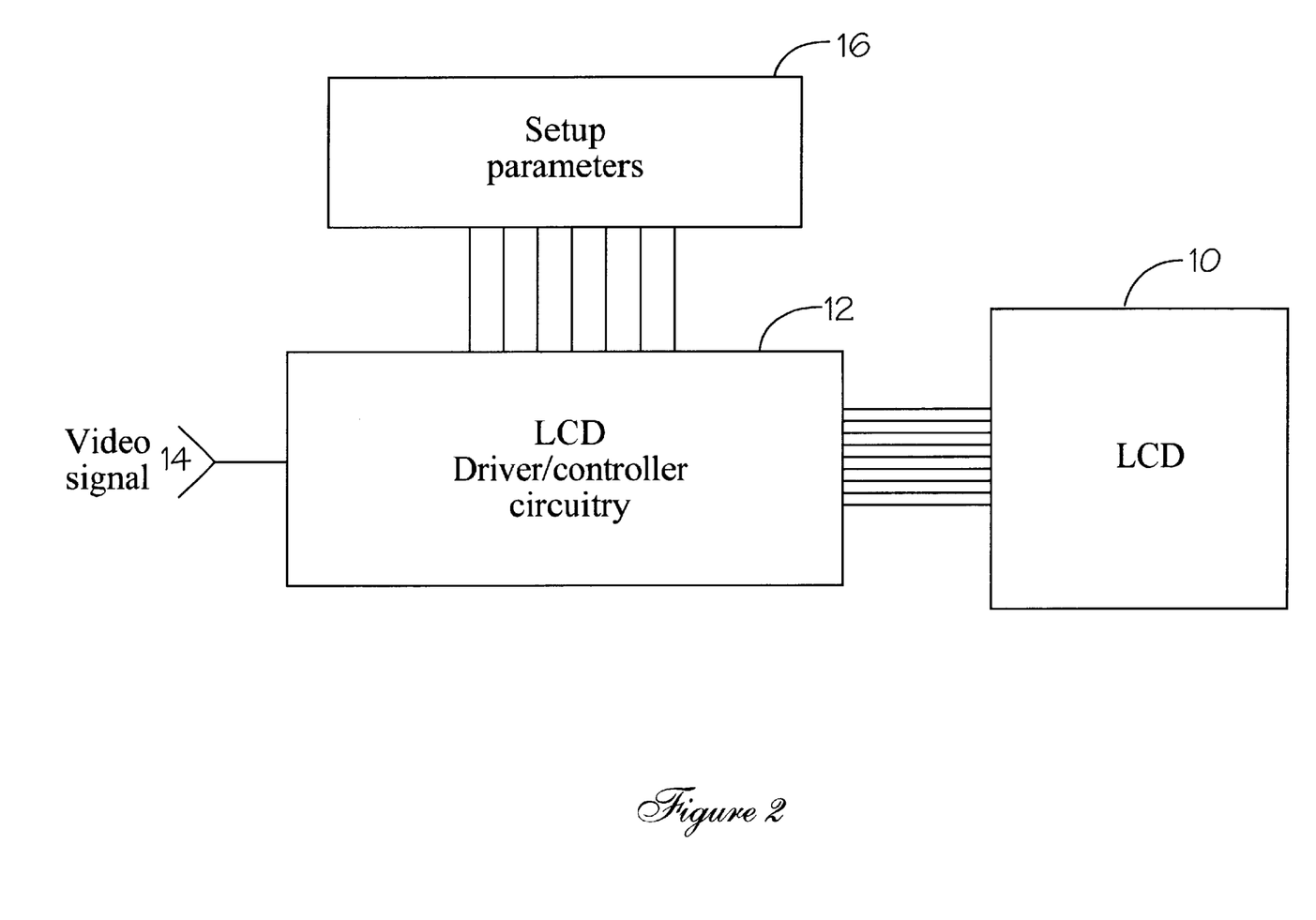
FIG. 2 illustrates a schematic view of a controller/driver circuit for the single monolithic LCD shown in FIG. 1.

Referring to FIG. 2, a schematic view of a controller/driver circuit is shown for the single conventional monolithic LCD display 10 illustrated in FIG. 1a. Such systems use commercial, LCD controller/driver chip sets 12. The video signal 14 is fed to the LCD driver/controller circuitry 12, which, in turn, controls the LCD 10. Contrary to this, in a tiled display the inter-tile color corrections must be made compatible with the functionality of, and connect to, the existing input pins of the chip set. By adjusting the set-up parameters 16, acceptable picture quality can be achieved.

Figure 3:
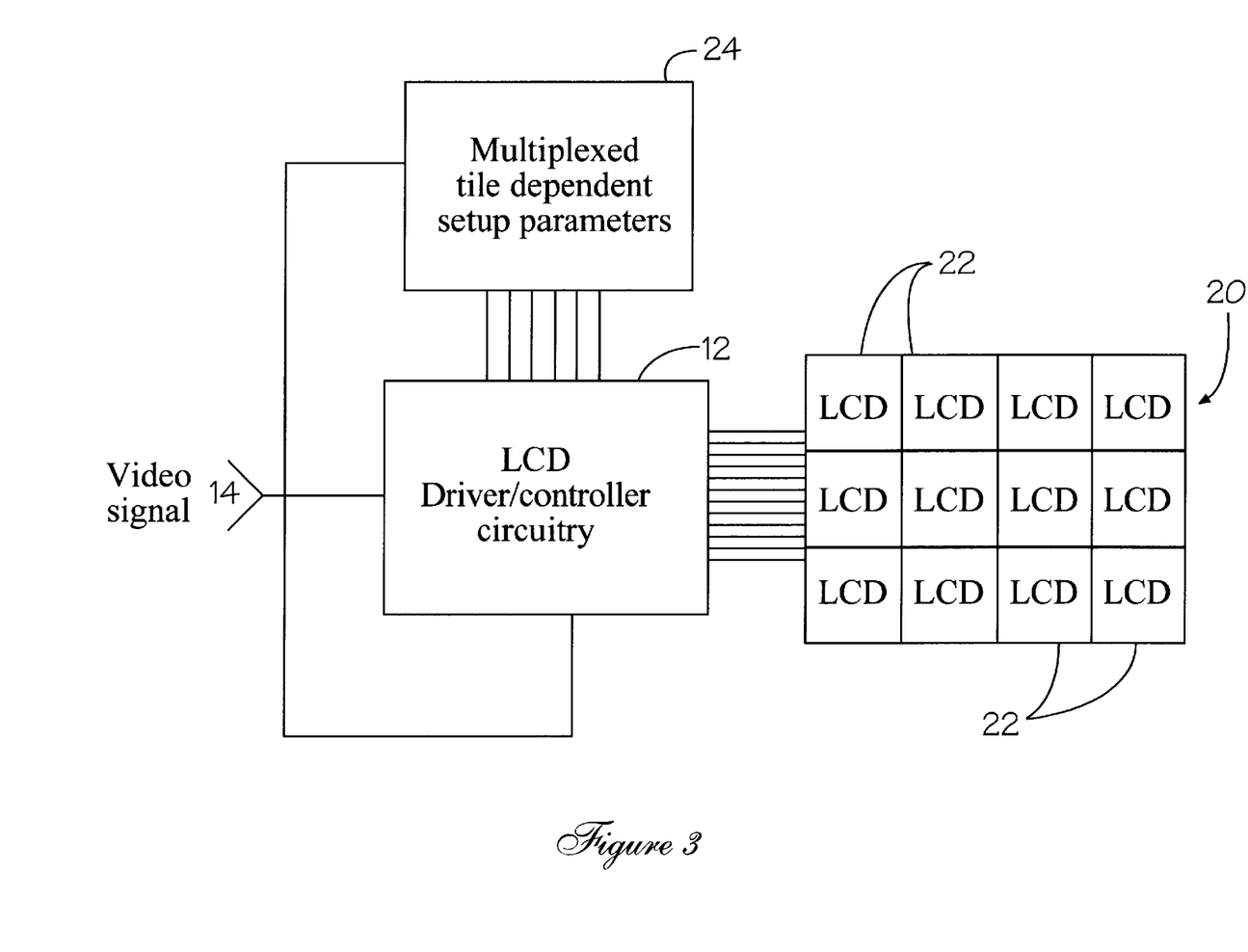
FIG. 3 depicts a schematic view of a controller/driver circuit as applied to a tiled LCD system having intra-tile color purity despite a continuous pixel pitch across the seams.

Referring to FIG. 3, a schematic is shown for the tiled LCD display 20 illustrated in FIG. 1. Each individual tile 22 in the mosaic has acceptable color purity with its own set of parameters for the controller/driver circuitry 12. The parameter values may be multiplexed (block 24) at the correct times to the controller, so that the appropriate values will be present when the data is being written to each tile 22.

Figure 4:
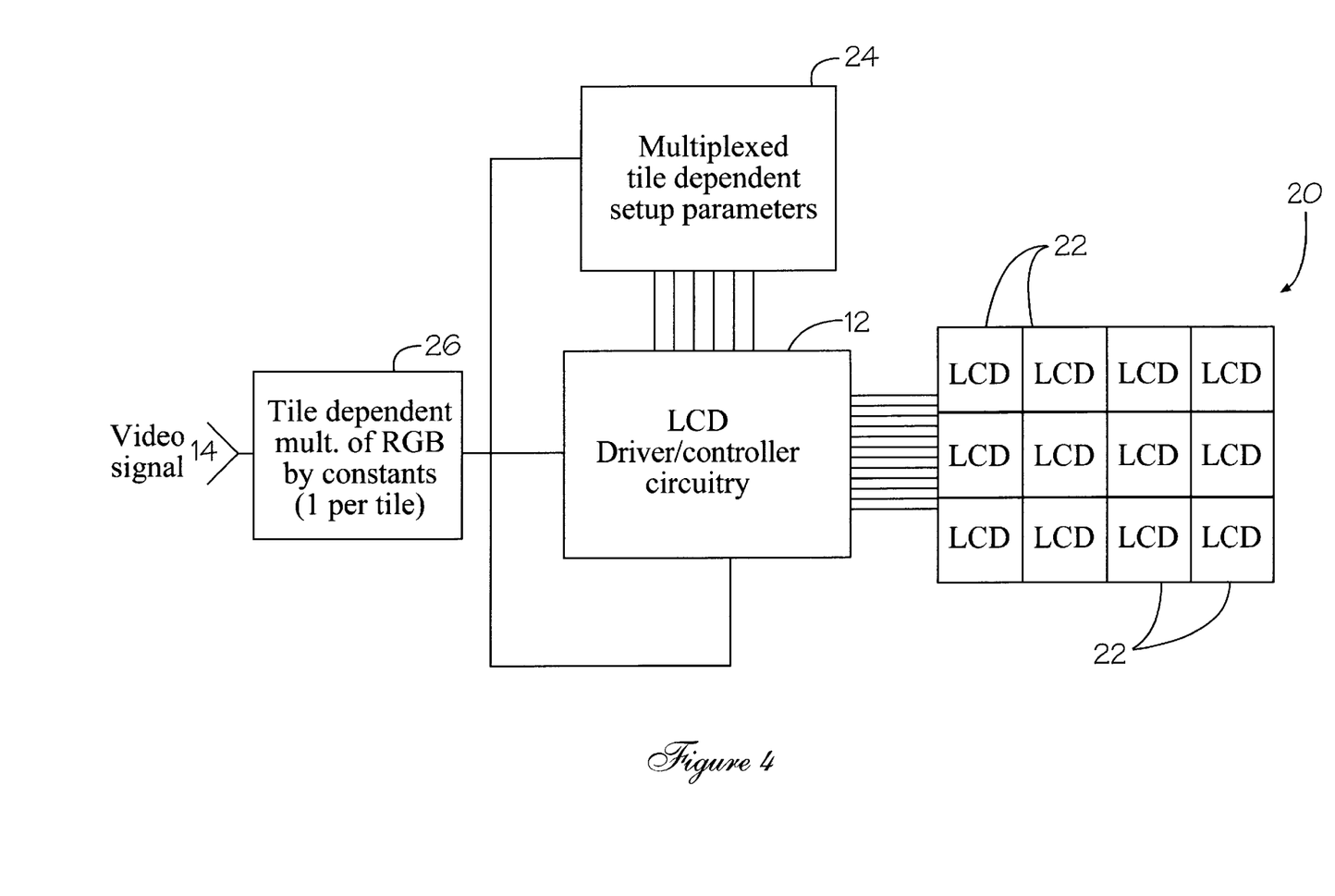
FIG. 4 illustrates a schematic diagram of the circuit of FIG. 3 with further correction for average tile brightness.

Referring to FIG. 4, the video signal 14 is now adjusted (block 26) with a tile-dependent set of constants (one for each tile 22), in order to match the average tile brightness for each of the tiles.

Figure 5:
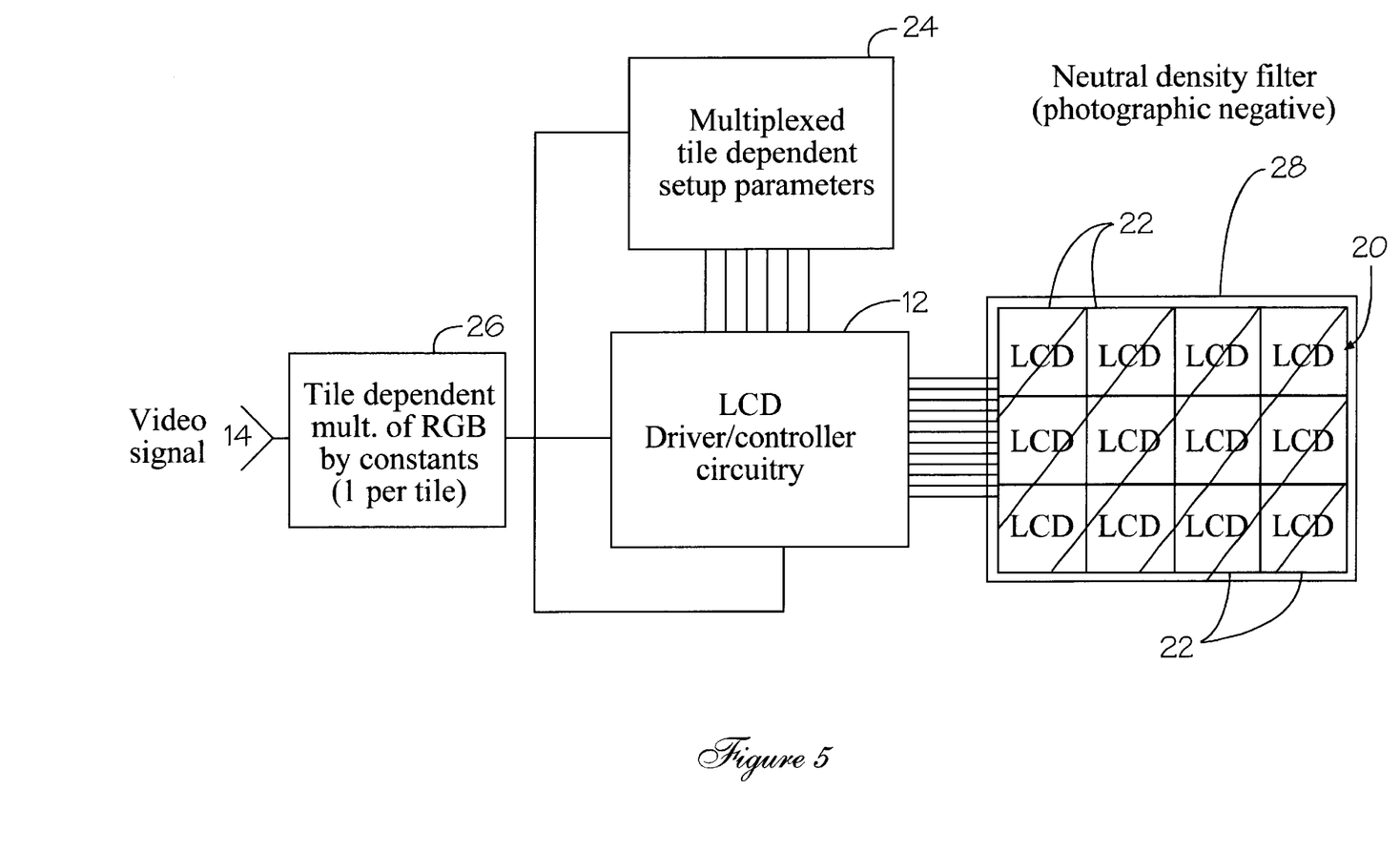
FIG. 5 shows a schematic diagram of the circuit of FIG. 4 with additional correction for discontinuities between tile edges.

Referring to FIG. 5, the discontinuities, or large level shifts between the edges of each tile 22, are nullified by making a negative (a graded neutral density filter having a gradient which is the inverse of the color non-uniformities) 28 of display 20, and placing it over the screen (not shown) of the display 20. This negative 28 can also be printed on the screen's front polarizer (not shown), or a separate thin plastic sheet (not shown). This will match the brightness levels across the entire surface of the display 20. The exposure will be made so that the dimmest region has no reduction. Only the brighter regions will be reduced. It is also possible to accomplish this electronically with another level of tile-dependent balancing parameters having a finer mesh (similar to those of block 26).

Figure 6:
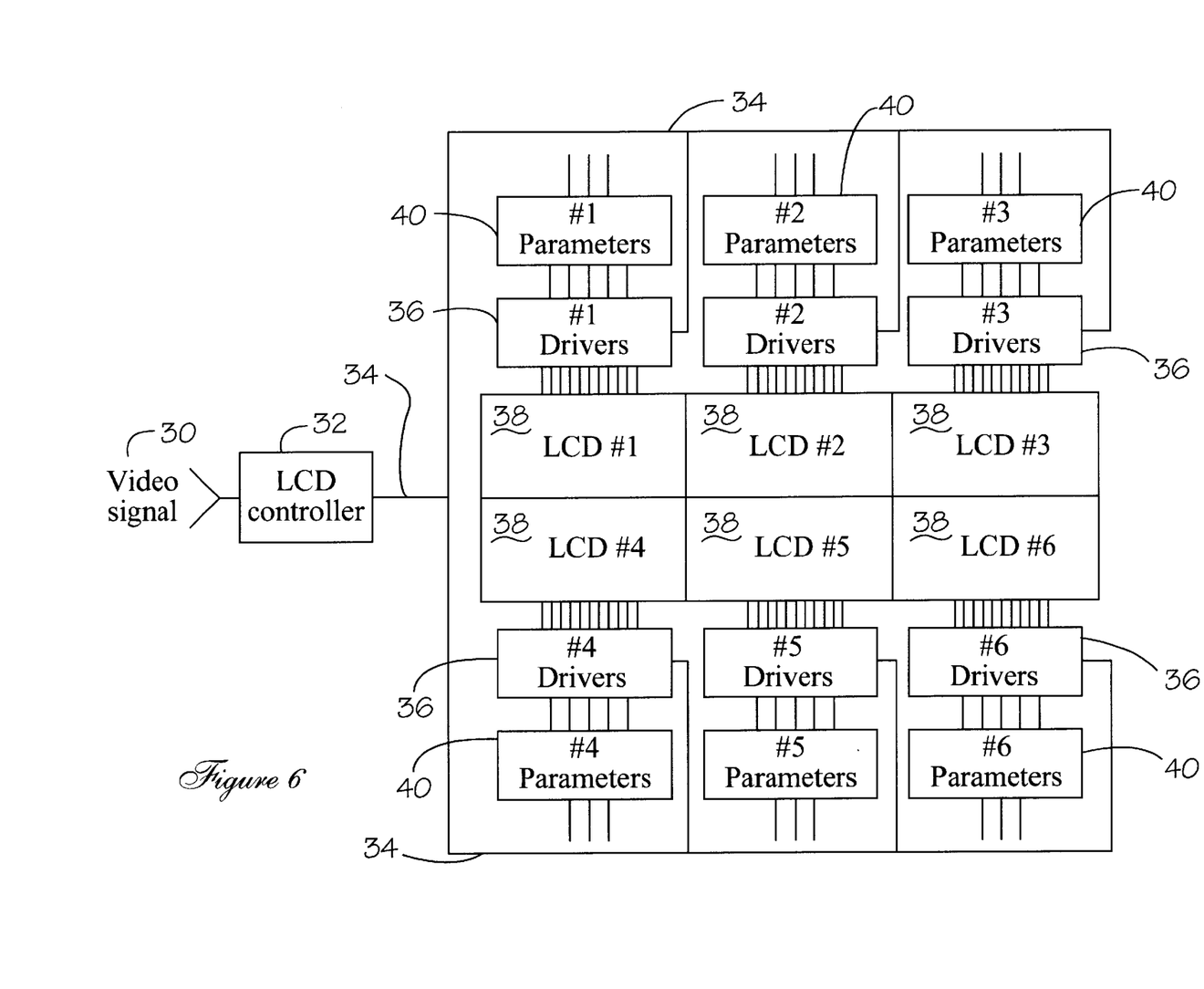
FIG. 6 shows a schematic diagram of an alternate embodiment of a circuit for multiplexing set-up parameters to tile driver circuitry.

Referring now to FIG. 6, there is shown a block diagram of an alternate method for applying tile-dependent correction constants to each of a plurality of tiles in a flat-panel display with a uniform pixel pitch. A video signal 30 is applied to a commercially available LCD controller 32. An output signal 34 from LCD controller 32 is applied simultaneously to each of a plurality of drivers 36, with each driver 36 being associated with an individual display panel 38. Each driver 36 is adapted to receive individual correction constants from parameters 40, which were previously stored in a memory device (not shown). Alternatively, set-up parameters may be permanently connected to the driver circuitry for each tile. In such a case, a common controller can still be used, as illustrated in FIG. 6. Individual, predetermined correction constants 40 are permanently provided to individual tile drivers 36 in this arrangement.

Figure 7:
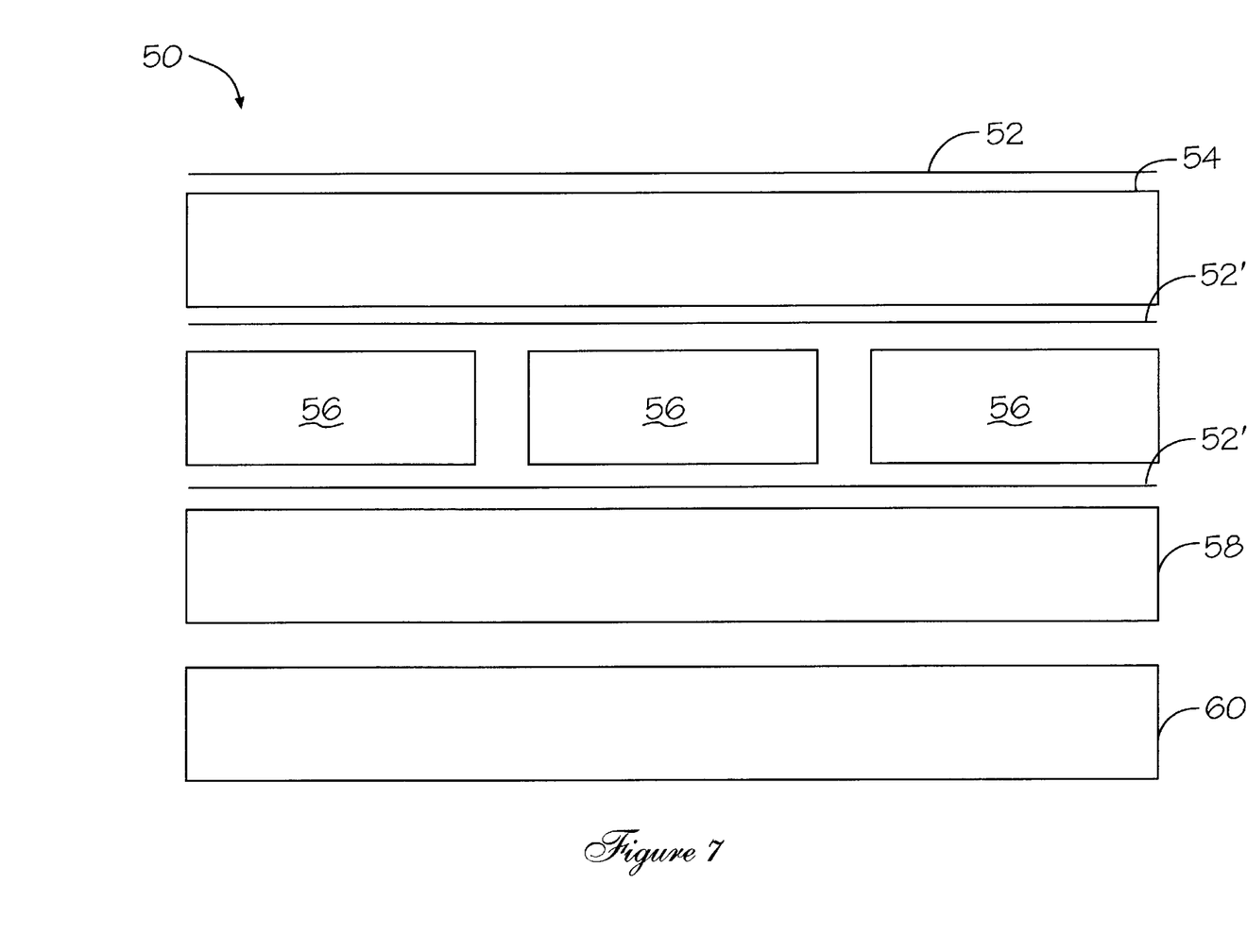
FIG. 7 is a cross-sectional view of a typical, tiled flat-panel display that incorporates a single color-balancing filter.

Referring now to FIG. 7, there is shown generally at reference number 50, a cross-sectional view of the structure of a typical, tiled, flat-panel display, used in the preferred embodiment. It should be understood, however, that components can be disposed in other sequences without departing from the scope of this invention. A color-balancing neutral density filter 52 is disposed at the top of the display structure 50. Immediately below filter layer 52 is a top optics layer 54. This optics layer 54 may contain a mask, screen, micro-lens or polarizer components, as described in the aforementioned, copending U.S. patent application Ser. No. 08/593,759. Disposed below the optics layer 54 is an optional, color-correcting neutral density filter 52'. Color-correcting filter 52' could replace color-balancing filter 52 or could be employed in addition thereto. Beneath the optional color-correcting filter 52' is a plurality of individual display tiles 56 manufactured and assembled with a uniform pixel pitch. In the preferred embodiment, tiles 56 are AMLCD tiles, with or without top and/or bottom polarizers.

Directly below tiles 56 is a third color-correcting neutral density filter 52", also optional. As indicated with filters 52 and 52', color-correcting filter 52" could either replace or augment any combination of filters 52 and 52'. Below the optional filter 52" is a bottom optics layer 58. This bottom optics layer 58 may contain a mask, screen, micro-lens or polarizer components, as also described in detail in copending U.S. patent applications, Ser. Nos. 08/593,759 and 08/571,208. The bottom layer of the flat-panel display 50 is a light source 60.

Figure 8:
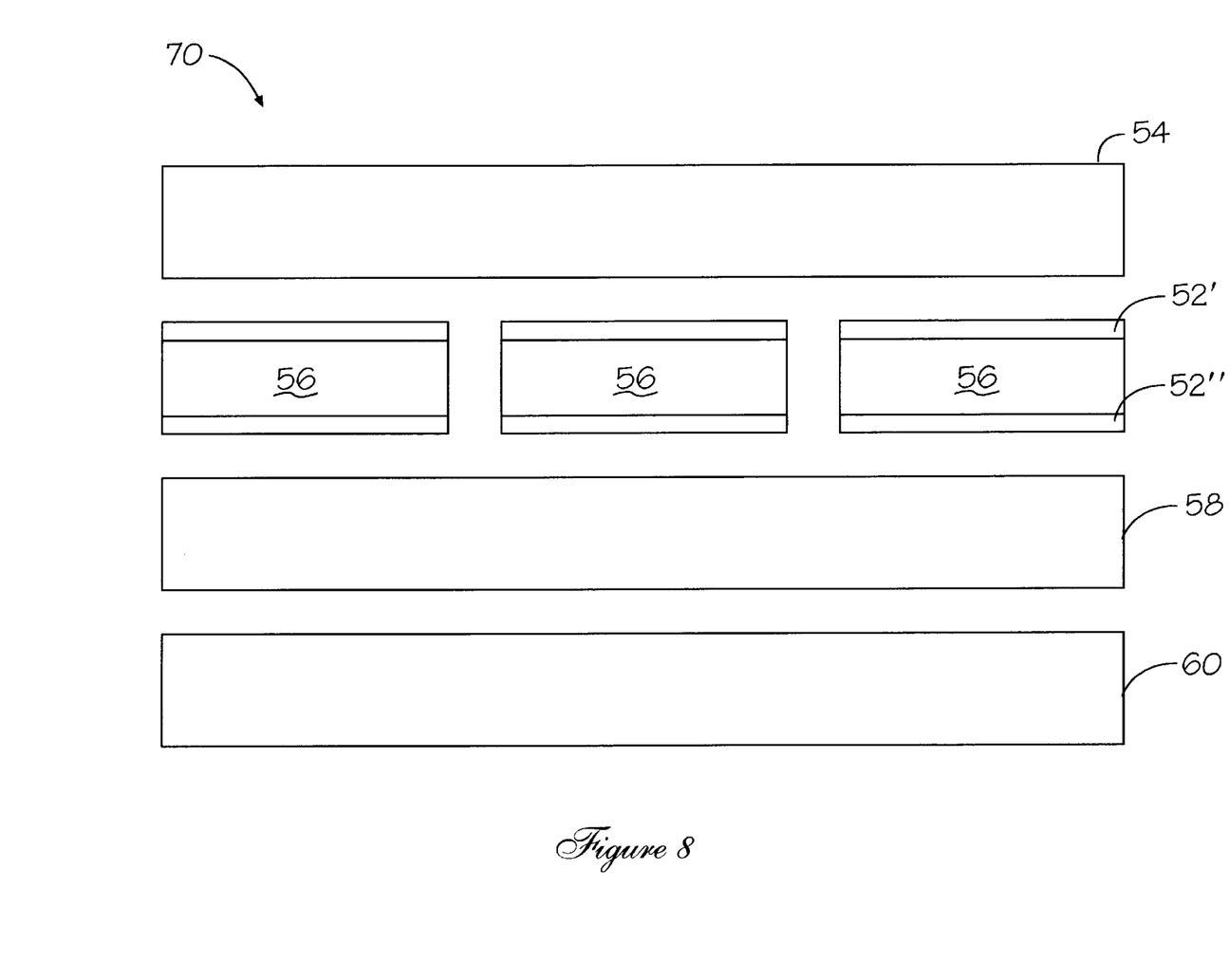
FIG. 8 is a cross-sectional view of a typical flat-panel display wherein each tile incorporates a separate color-balancing filter.

Referring now to FIG. 8, there is shown generally at reference number 70 a cross-sectional view of another embodiment of a tiled, flat-panel display. This embodiment differs from the tiled, flat-panel display 50 (FIG. 7), in that discrete, color-correcting neutral density filter layers 52" and/or 52" are associated with the respective individual tiles 56. That is, each individual tile 56 has associated with it a unique filter layer 52' and/or 52". In the tiled, flat-panel display 50 (FIG. 7), on the other hand, a single filter layer 52, 52', or 52" covers more than one tile 56 and possibly an entire matrix of tiles.

Figure 9A:
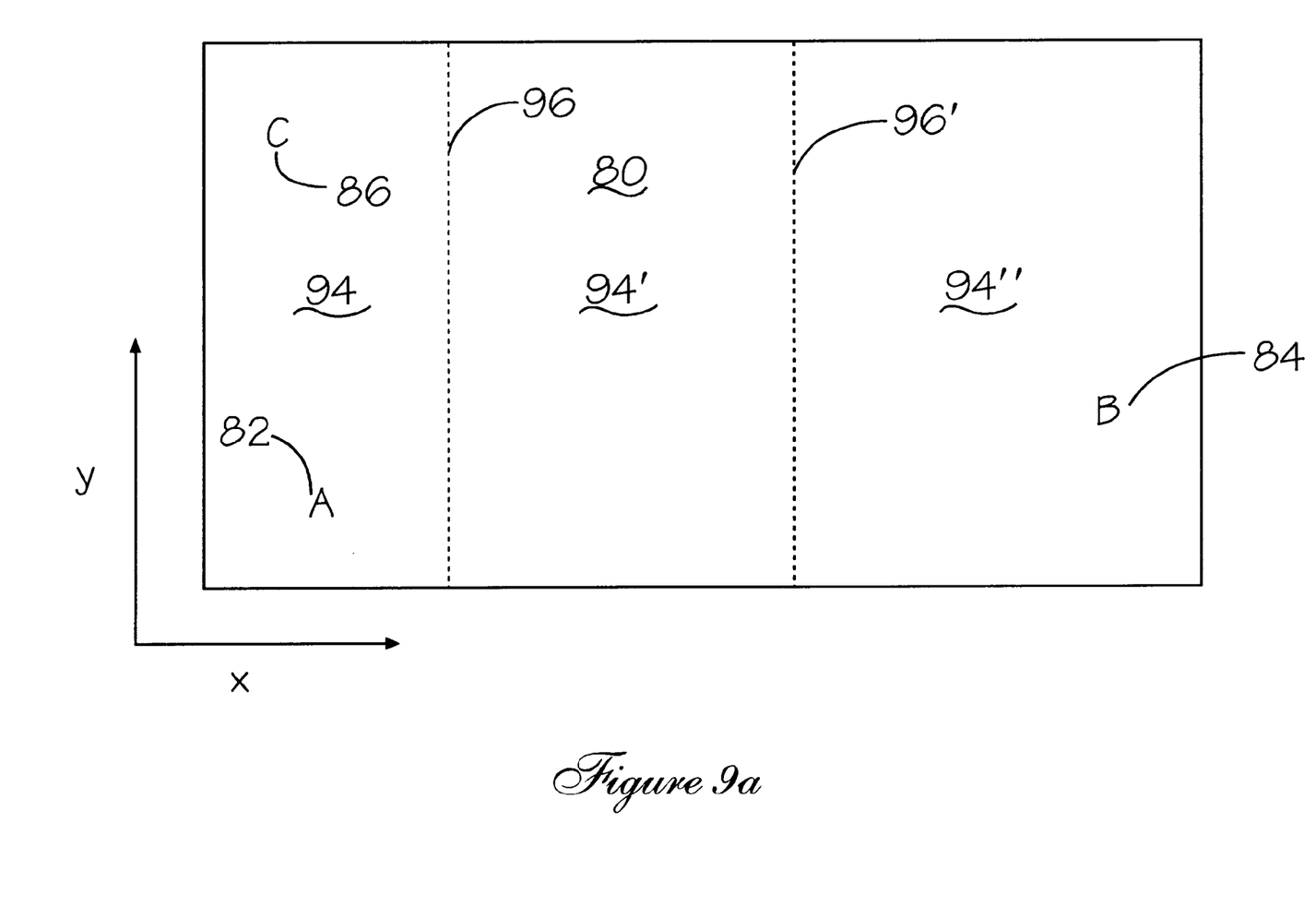
FIG. 9a is a top view of a typical, flat-panel display showing reference points corresponding to the relative transmission plot shown in FIG. 9b.

Referring now to FIG. 9a, there is shown a plan view of the top surface of a typical, tiled, flat-panel display 80. Locations A (82), B (84) and C (86) are points on the surface of display 80. These points 82, 84 and 86 are defined by x,y coordinates along the indicated x and y axes.

Figure 9B:
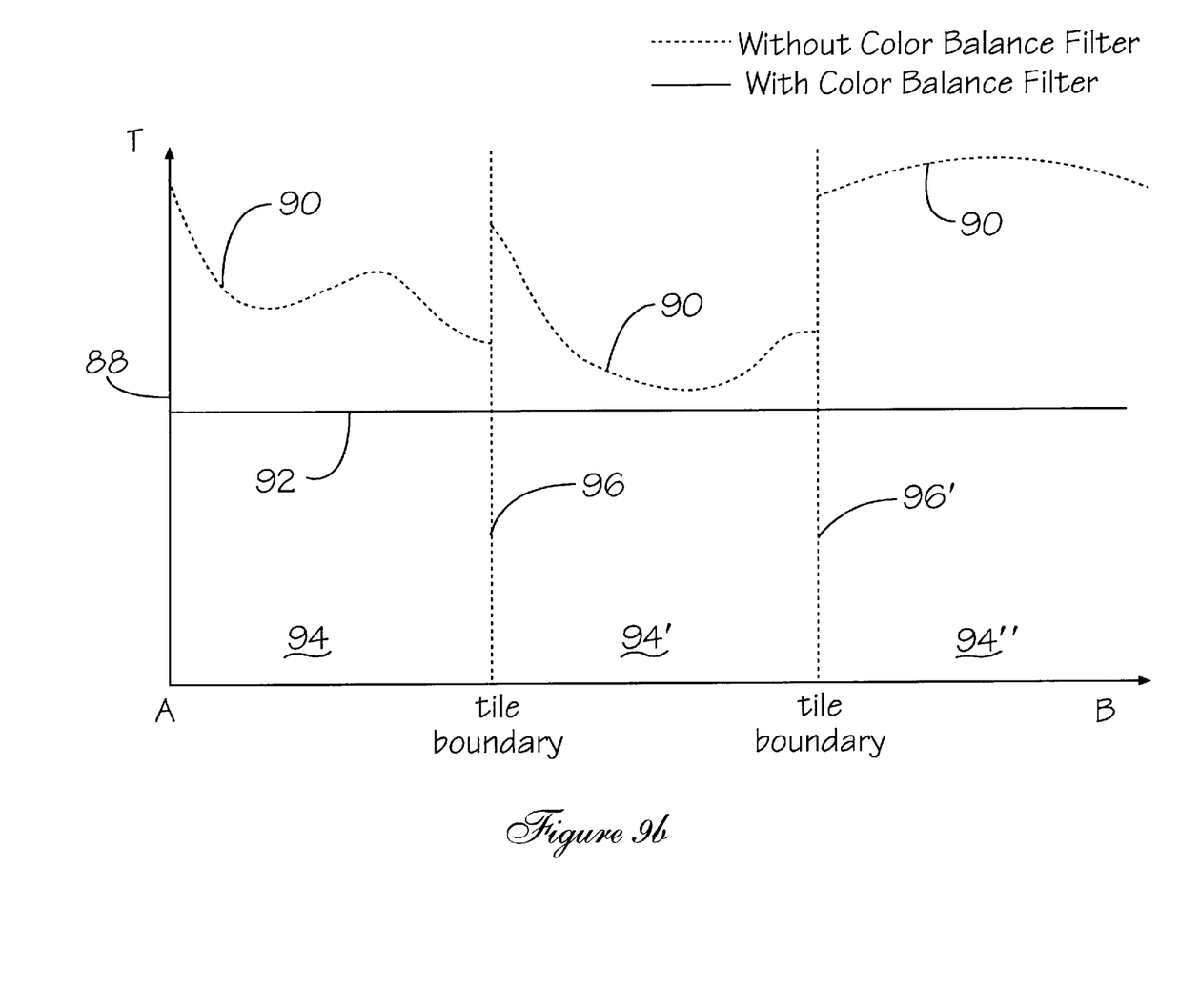
FIG. 9b shows the relative light transmission of a typical, tiled flat-panel display under average white-field drive conditions, both with and without a color-balancing filter.

FIG. 9b graphically depicts the relative optical transmission T 88 of a tiled, flat-panel display 80 (FIG. 9a) under average, white-field drive conditions at y=, C, from x=A to x=B. Two relative optical transmission curves 90 and 92 are plotted in dashed and solid lines, respectively. Transmission curve 90 depicts the actual relative optical transmission across three uncorrected tile segments 94, 94' and 94" that are separated by tile boundaries 96 and 96', as shown. Particular attention should be paid to the abrupt discontinuities which occur at tile boundaries 96 and 96' and the rather smooth variations within the tiles. Transmission curve 92 shows a corrected, effectively "flat" or constant optical transmission across the three tiles 94, 94' and 94". The corrected, flat transmission of curve 92 was achieved by the application of an appropriately graded, neutral density color-correction filter (not shown). Such a filter effectively compensates for relative transmission differences across individual tiles. The filter's effect becomes pronounced at the tile boundaries 96 and 96', where the abrupt discontinuities observed in curve 90 are eliminated.

Figure 10:
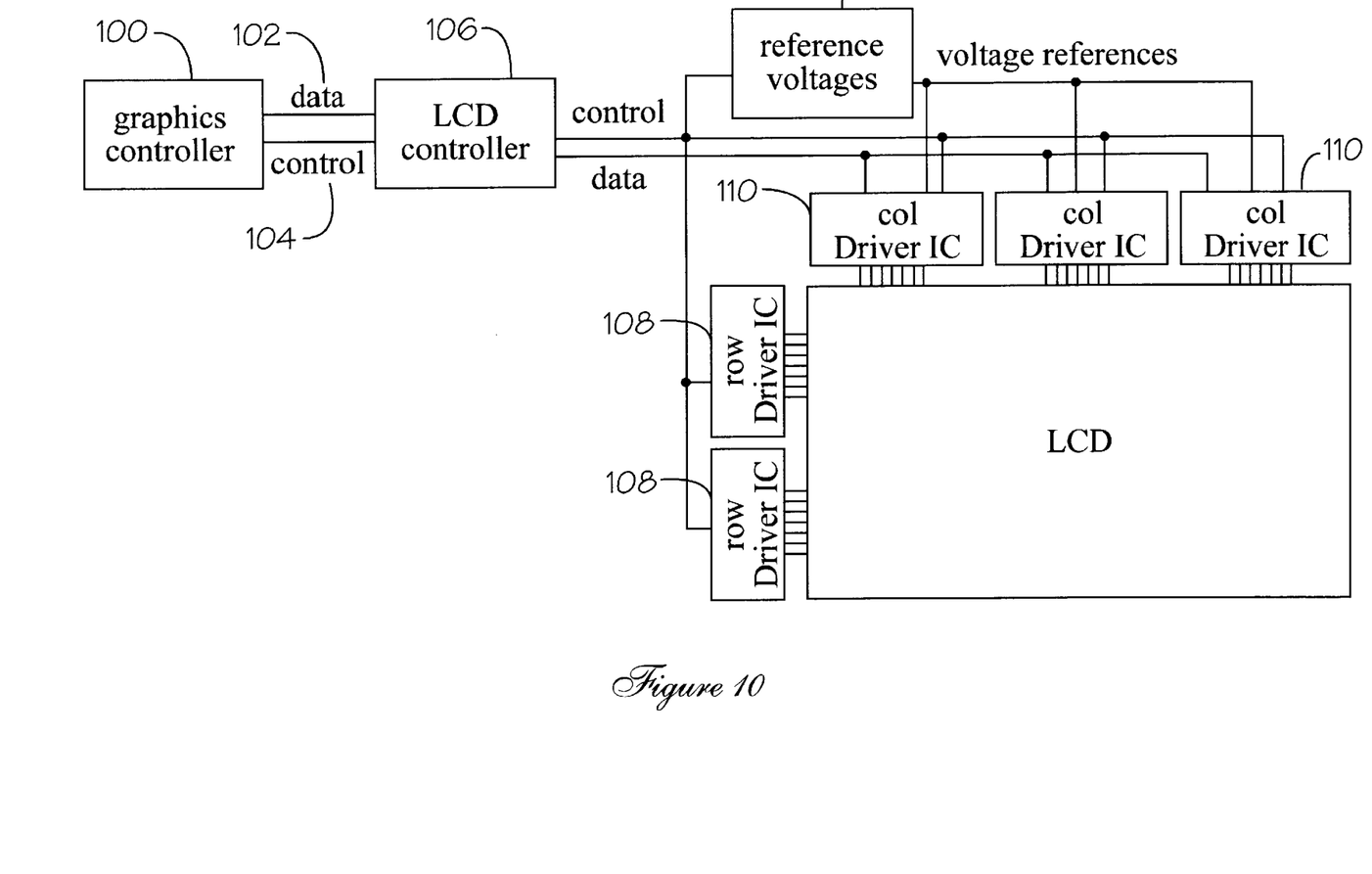
FIG. 10 is a system block diagram showing typical components that are required to display a video image on an LCD display.

Referring now to FIG. 10, there is shown a block diagram interconnecting the components of a typical LCD display. A video signal (not shown) is first applied to a graphics controller 100. This graphics controller 100 retrieves digitized image information from memory (not shown) and generates both image data 102, and control and synchronization information 104. Such graphics controllers are commercially available.

Image data signal 102 and the control and synchronization signal 104 are applied to the inputs of an LCD controller 106, which is typically implemented as an application-specific integrated circuit (ASIC). The function of the LCD controller 106 is to generate additional timing and control signals that are responsive to input signals 102 and 104, in order to control the row driver ICs 108 and column driver ICs 110. In addition, LCD controller 106 provides signals to other circuitry necessary for the operation of an LCD-type display. Reference voltage generator 112 provides a set of voltages (usually DC) necessary to match the unadjusted relative transmission of individual LCD tiles, as shown in curve 90 (FIG. 9b), to the corrected relative transmission curve 92. These reference voltages are typically generated by circuits, such as operational amplifiers, digital-to-analog converters or the like. The level of these reference voltages may be adjusted with any additional control circuitry (not shown) required by a specific application. For AMLCDs, row drivers 108 may be implemented as ICs, and generate gate voltage pulses that are typically in the 15 –40 volt range to the gates of thin film transistors (not shown). Typical ICs suitable for use as column drivers are for example S-MOS SED1743 and Texas Instruments' type 57600 devices. Column drivers 110 generate the voltage signal levels representative of the input video signal (not shown). These voltages are provided to the sub-pixels by gate pulses. Column drivers 110 are generally implemented as ICs, with typical examples being Cirrus Logic CL-FP6522, Texas Instruments TMS 57481 and Vivid Semiconductor VS1192 devices.

It should be understood that other or ancillary control and video signal processing-circuitry can be used, depending on the type of tiles used to construct the flat-panel displays.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

References:

[1] Thomas P. Brody, assigned to Magnascreen Corporation, U.S. Pat. No. 4,982,275, issued Jan. 1, 1991.

[2] Kazuhiro Watanabe, Makoto Ota, and Toshimara Imamura, assigned to Mitsubishi Denki Kabushiki Kaisha, U.S. Pat. No. 4,825,201, issued Apr. 25, 1989.

[3] Ryuuichi Someya, Fumio Inoue, Nobuaki Kabuto, Fumio Haruna, and Tekeshi Maruyama, assigned to Hitachi, Ltd, U.S. Pat. No. 5,396,257, issued Mar. 7, 1995.

Having thus described the invention, what is desired to be protected by Letters Patent is presented in the subsequently appended claims.

What is claimed is:

1. A tiled, substantially flat, panel display with color-correction capability, comprising:

a mosaic of individual display tiles of a given number, said tiles, when assembled, providing a monolithic display having visually imperceptible seams, said display tiles having column and row inputs that are provided for a single display tile system, said column and row inputs being distributed over said given number of tiles using matrix addressing, said display tiles being sorted into groups that have substantially matching color coordinates prior to assembly into a display, with each individual tile in the mosaic having its own set of characteristics;

graded neutral density filter disposed adjacent said mosaic, said graded neutral density filter having a grading function that represents the inverse of brightness distribution non-uniformities in the display;

means defining a video input signal; and controller/driver means connected to said mosaic for selectively applying said video input signal to said mosaic, so that color purity is maintained over substantially all of said individual display tiles, whereby the imperceptibility of said visually imperceptible seams is enhanced.

2. The tiled, substantially flat, panel display with color-correction capability in accordance with claim 1, further comprising means for balancing said video input, wherein average tile brightness is achieved by modifying a level of said video input with a predetermined tile-dependent set of parameters.

3. The tiled, substantially flat, panel display with color-correction capability in accordance with claim 1, wherein said inverse of the color non-uniformities in the display will substantially match the brightness levels across the entire display, and wherein the dimmest regions of the display have the least reduction.

4. The tiled, substantially flat, panel display with color-correction capability in accordance with claim 1, further comprising means for electronically modifying the video input, wherein brightness levels across the entire display will be substantially matched.

5. The tiled, substantially flat, panel display with color-correction capability in accordance with claim 1, wherein said mosaic is defined as a selected, substantially matched set of display tiles having the intra-tile average values of brightness and color for each color fall within a specified range for each display tile.

6. The seamless, tiled, substantially flat, panel display with color-correction capability in accordance with claim 1, wherein said graded neutral density has a minimum optical density at the dimmest region of said display.

7. The seamless, tiled, substantially flat, panel display with color-correction capability in accordance with claim 1, wherein said mosaic is defined as a selected, substantially matched set of display tiles having the intra-tile average values of brightness and color for each color fall within a specified range for each display tile.

8. The seamless, tiled, substantially flat, panel display with color-correction capability in accordance with claim 2, wherein said display tiles are LCDs and wherein said tile-dependent set of parameters that determine the display characteristics of each tile comprises any of the elements taken from the set of:
   a) threshold voltage values of a pixel;
   b) maximum/minimum transmissivities of a pixel;
   c) pixel voltage optical gains;
   d) color coordinates; and
   e) tile edge-related parameters.

* * * * *